Feb. 12, 1935.　　　A. H. JONES　　　1,990,735
TRANSMISSION
Filed Sept. 27, 1933　　4 Sheets-Sheet 1

INVENTOR
ADRIAN H. JONES
By Adam E. Fisher
ATTORNEY

Feb. 12, 1935.  A. H. JONES  1,990,735
TRANSMISSION
Filed Sept. 27, 1933   4 Sheets-Sheet 2

INVENTOR
ADRIAN H. JONES
By Adam E. Fisher
ATTORNEY

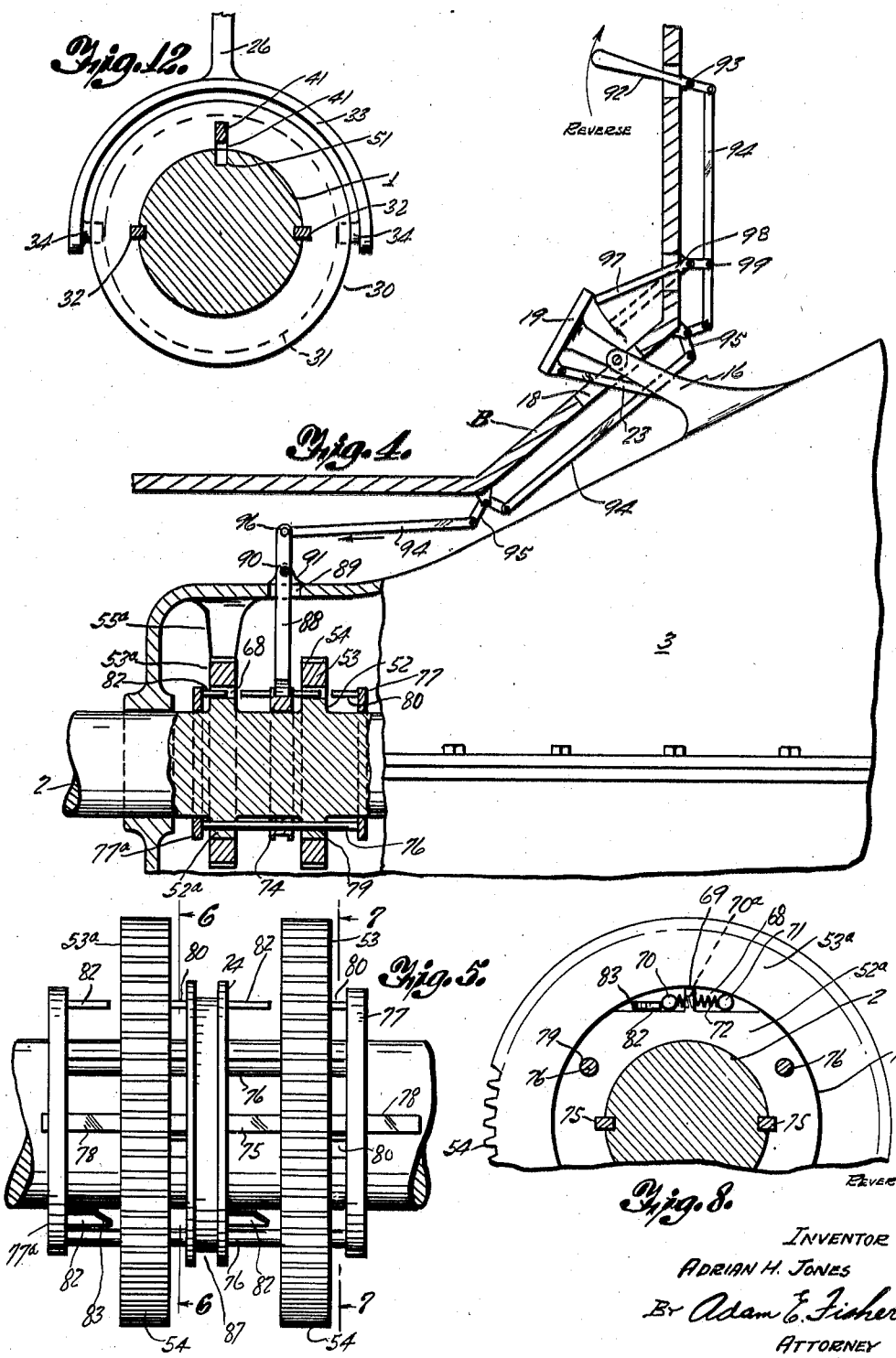

Feb. 12, 1935. A. H. JONES 1,990,735
TRANSMISSION
Filed Sept. 27, 1933 4 Sheets-Sheet 4
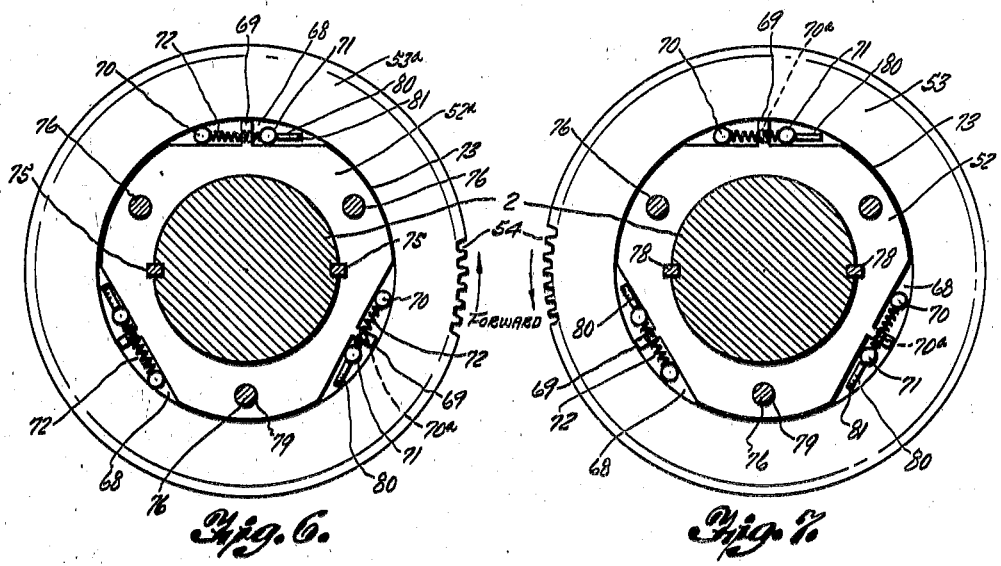
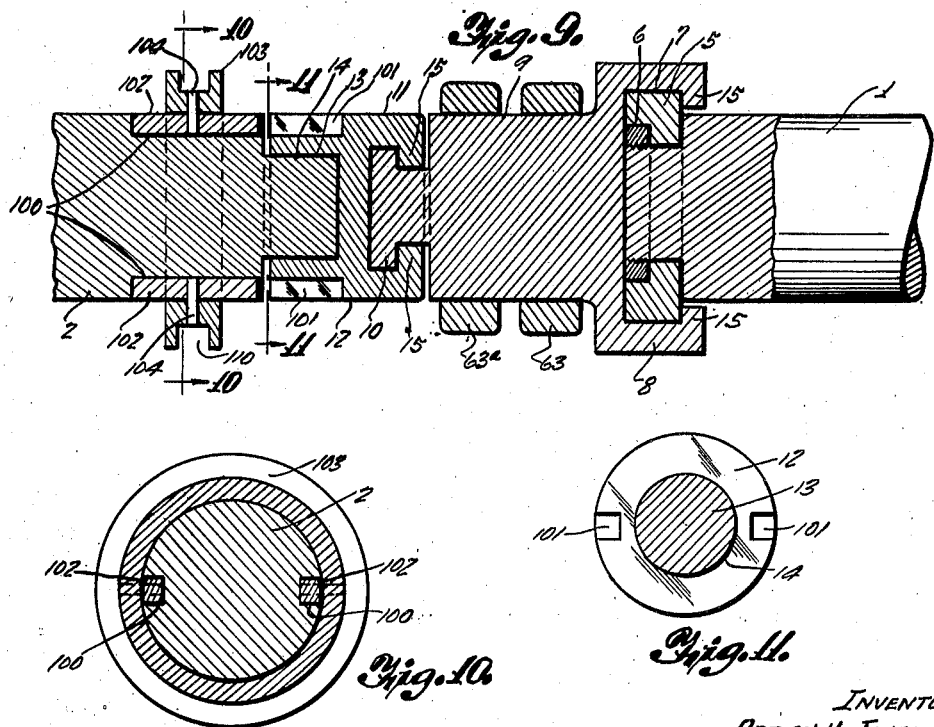
INVENTOR
ADRIAN H. JONES
By Adam E. Fisher
ATTORNEY Patented Feb. 12, 1935

1,990,735

UNITED STATES PATENT OFFICE 1,990,735

TRANSMISSION

Adrian H. Jones, Plymouth, Mass., assignor of one-half to Ernest B. Jones, Middleboro, Mass.

Application September 27, 1933, Serial No. 691,154

1 Claim. (Cl. 74—117)

My invention relates to improvements in transmissions or speed changing devices for automotive vehicles of all kinds.

The main object of the invention is to provide a transmission in which the speed changing is brought about and controlled solely by a foot pedal taking the place of the usual clutch and clutch pedal and eliminating the gear shift lever now employed.

Another object is to provide a transmission of this kind in which any relative output or axle speed may be obtained from the engine up to and including a speed equal to that of the engine and in which the transition or change in speed from either extreme to the other is "flowing" or stepless throughout the range.

Another object is to provide a novel, simple and efficient reversing mechanism with a manual control for initially setting it in operation after which the pedal again controls the speed, there being an automatic pedal stop means to limit the speed while in reverse.

Another object is to provide a novel and efficient stepless transmission mechanism in which the clutch pedal controls the eccentricity or stroke of a pair of crank members operated by the drive shaft and arranged to oscillate a pair of clutch members connected to and driving the driven shaft, the amount or extent of this oscillation and hence the relative speed of the driven shaft being varied to any degree by the operation of the food pedal in changing the stroke of the said cranks.

Another object is to provide a means operated by the foot pedal in its full or high speed position to automatically lock the drive shaft to the driven shaft whereby both are driven at engine speed, the said cranks being at the same time automatically restored to their normal centered and inoperative position but arranged to be again set in motion by reverse movement of the foot pedal to gradually diminish the speed when it is desired to stop.

A further object is to provide a transmission of the foregoing characteristics which includes axially aligned driving and driven shafts independently rotatable, the said drive shaft carrying a sliding eccentric which may be moved off center in any degree by a foot pedal and which therefore varies the stroke of cranks attached to the eccentric, the said driven shaft carrying a pair of gear toothed clutches oscillated or rocked through gear segments by the cranks and having clutch wedges adapted to lock the clutches to the shaft in one direction and release them during the reverse or return movement, there being manually controlled means for releasing these clutch wedges and moving others into locking position to lock the clutches to the driven shaft in the opposite or reverse direction, there being also a locking means operated by the foot pedal when in its high speed position to rigidly lock the driving and driven shafts together and to return the eccentric and cranks to centered and inoperative position while they are not needed or in use.

With these and other objects in view my invention resides in the novel construction and arrangement of parts as hereinafter fully set forth and claimed, reference being had to the accompanying drawings wherein:

Figure 4 is a fragmentary side elevation of the transmission partly broken away and in section showing the parts in reverse position and showing the floor boards in section.

Figure 5 is an enlarged side elevation of the driving clutches and reversing mechanism with the parts in forward speed positions.

Figures 6 and 7 are vertical sections along the lines 6—6 and 7—7 in Figure 5 again with the parts in forward speed positions.

Figure 8 is a fragmentary view similar to Figure 6 but showing the parts in reverse position.

Figure 1:
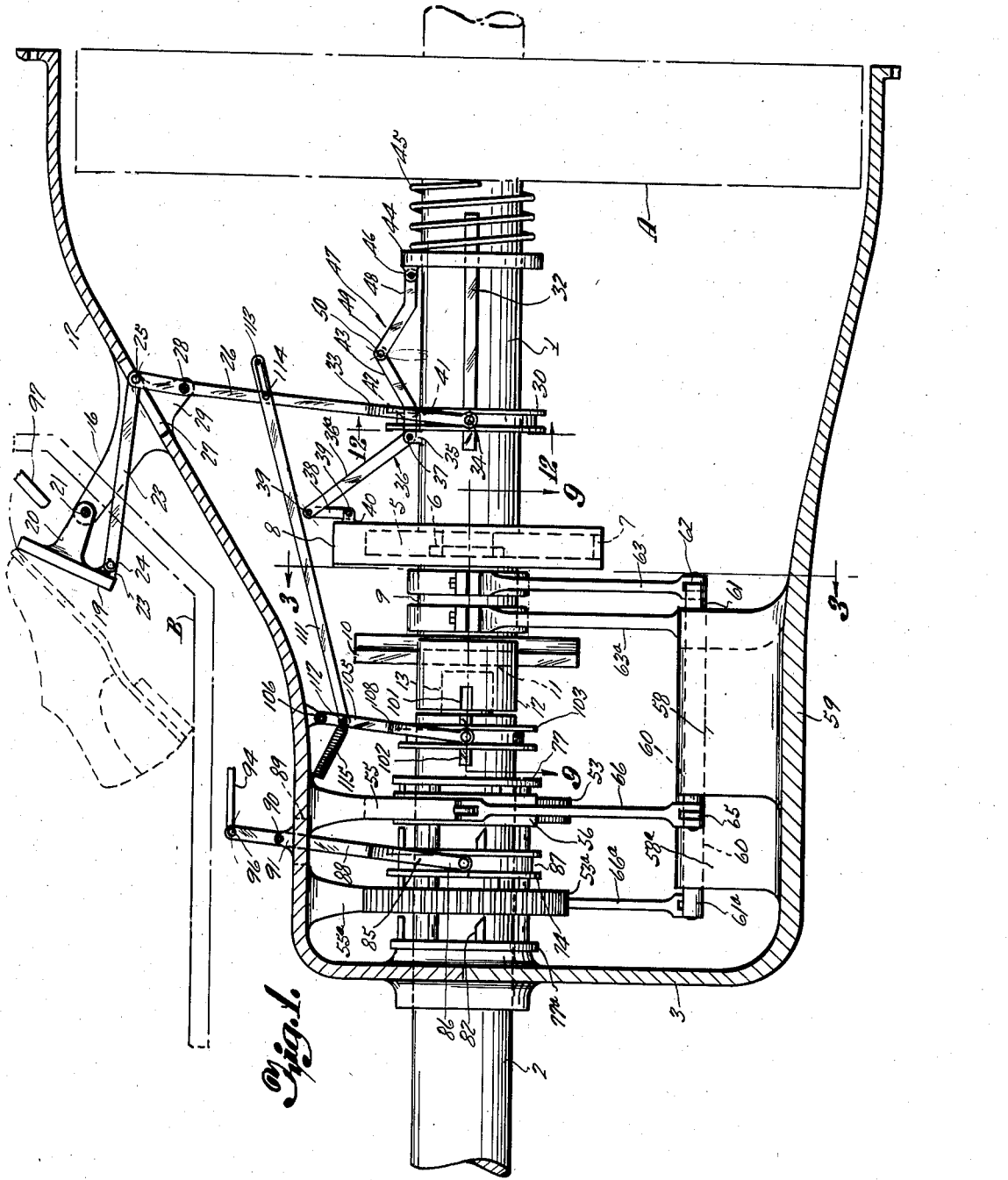
Figure 1 is a side elevation of the transmission showing the case or housing in section and the flywheel, auto floor boards and foot of the driver in dot dash lines, the parts being in neutral or starting position.

Figure 9 is an enlarged horizontal section along the line 9—9 in Figure 1.

Figures 10 and 11 are vertical cross sections along the lines 10—10 and 11—11 in Figure 9.

Figure 12 is an enlarged vertical cross section along the line 12—12 in Figure 1.

Referring now with more particularity to the drawings my invention comprises a drive shaft 1 and driven shaft 2 arranged in axial alignment for independent rotation in and through a housing 3 which may be of usual construction and any suitable shape and size. The drive shaft 1 is directly driven by the engine (not shown) and carries a flywheel shown in dot dash lines A. The two shafts 1 and 2 terminate considerably short of meeting at their adjacent ends as shown and an eccentric slide or core 5 is secured by nut 6 to the rear or inner end of the driven shaft 1 and slidably plays within the groove or slideway 7 of the eccentric carrier 8. An eccentric pin 9 is extended rearwardly from this carrier 8 and after a short distance terminates in a T or slide head 10 which is slidably mounted in the cleft or groove 11 formed in the end of a connecting bearing block 12. At its rear end the block 12 then has a central pilot bearing socket 13 in which a pilot pin 14 formed on the forward end of driven shaft 2 is journaled. This arrangement is such that the eccentric carrier 8, pin 9 and head 10 may all be adjusted as a unit radially or laterally outward from the center line of shafts 1 and 2 without disturbing the alignment thereof and at the same time holding the parts together through the hooks or inturned lips 15 at the grooves 7 and 11 as will be readily apparent.

Figure 2:
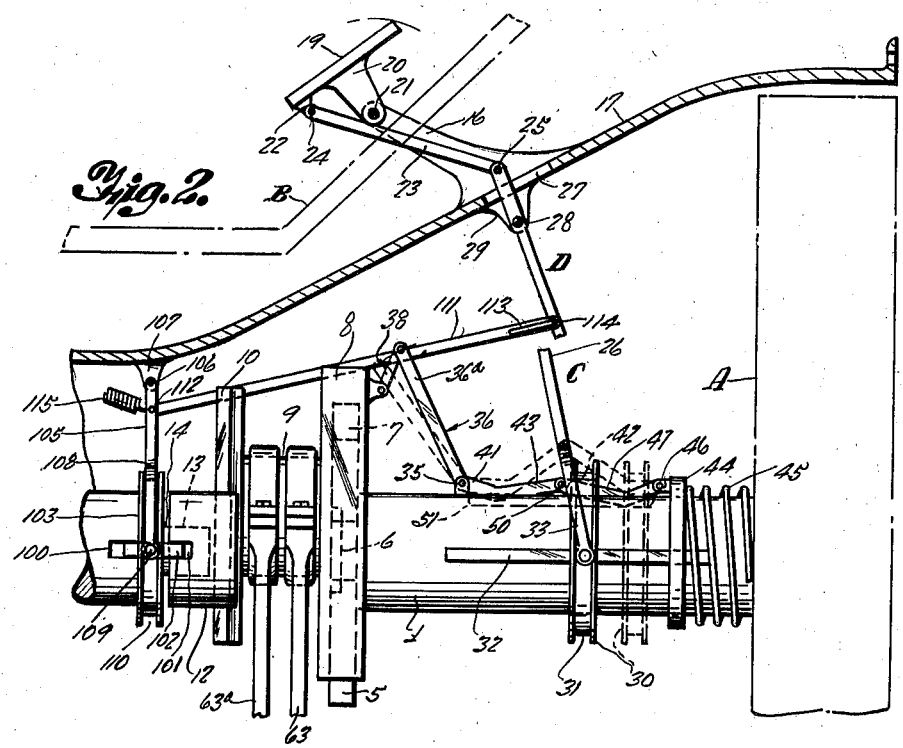
Figure 2 is a fragmentary view similar to Figure 1 but showing certain of the parts in full or high speed position.

Spaced pedal brackets 16 are extended angularly upwardly and rearwardly from the housing top 17 at a point somewhat forwardly of the eccentric carrier 8 and extends at their ends through an opening 18 in the auto floor boards B and a foot pedal 19 is pivotally mounted by its extended lug 20 at 21 between these brackets. At a point below this lug 20 an ear 22 is provided on the pedal 19 and a link 23 is pivoted at 24 thereto and extended forwardly and pivoted at 25 to a shifter arm 26 which passes freely through an opening 27 in the housing top 17 and is fulcrumed at 28 between depended brackets 29. A shifting pulley 30 having a peripheral groove 31 is slidably but not rotatably mounted on the drive shaft 1 by keys 32 forwardly of the eccentric carrier 8 and the shifter arm 26 terminates at its' lower end in a fork 33 embracing the pulley 30 and having pins 34 playing in the groove therein. By pressing on the foot pedal 19 and tilting it forwardly on pivot 21 the link 23 exerts a rearward pull on the upper end of shifter arm 26 and slides the shifting pulley 30 forwardly on the drive shaft as shown in Figure 2. Just rearwardly of the normal rearward position of the pulley as shown in Figure 1 bearing ears 35 are provided on the drive shaft 1 and a shifting lever or arm 36 is fulcrumed at 37 thereto. At its rear end 36a this lever 36 extends angularly outward from the shaft toward one end of the eccentric carrier 8 to which it is connected by a link 38 pivoted at its ends 39 to the lever and to an ear 40 on said carrier. At its forward end the lever extends a short distance parallel with the shaft 1 as designated at 41 and passes slidably through a slot or notch 42 in pulley 30 and then has a finger 43 extended angularly outward away from the shaft. A collar 44 is slidably mounted on the shaft 1 and keyed thereto by the keys 32 forwardly of the pulley 30 and is normally urged rearward by a coil spring 45 braced against flywheel A. This collar 44 has a bearing ear 46 to which a lever 47 is pivoted and from this point the lever extends first parallel with the shaft 1 a short distance as at 48 and then terminates in a finger 49, extended angularly outward toward the free end of the finger 43 to which it is pivoted at 50. The forward portion of lever 36 and lever 47 from what might be and are hereinafter termed toggle levers and it will now be understood that the aforesaid forward movement of the pulley 36 by the foot pedal 19 will press the angularly extended fingers 43 and 49 of the toggle levers inward toward the shaft 1 swinging the rear portion 36a outward and simultaneously urging the collar 44 forwardly against the spring 45. This outward motion of the rear end 36a of the lever moves the carrier 8 laterally or radially outward and carries the eccentric pin 9 off center relative to the axes of the two shafts 1 and 2. When the angular fingers 43 and 49 are pressed flat against the shaft 1 the eccentric carrier 8 is of course moved outward to its fullest extent (Figure 2) and a short continued forward movement of the pulley 30 then allows the spring 45 to urge the collar 44 rearward to its normal position and cause the fingers 43 and 49 to spring outward restoring the eccentric carrier to centered position. At this point the pulley 30 comes to rest over the portion 48 of the lever 47 adjacent collar 44 as shown in dotted lines in Figure 2. When the pulley is again moved rearwardly to its normal position by tilting the pedal 19 in opposite direction the same action of the toggle levers take place and the eccentric carrier 8 is moved outward and then back to centered position. At all times the spring 45 tends to hold the parts in normal position with the fingers 43 and 49 sprung outward and the carrier 8 on center and the parts may assume these positions at either end of the forward and rearward stroke or movement of the pulley 30 when it rests over the portions 41 and 48 of the toggle levers. The shaft 1 may be slotted as at 51 to clear the levers as they are pressed inward by the sliding pulley.

Spaced diametrically enlarged hubs 52 and 52a are provided on the driven shaft 2 at some distance behind its foremost end and driven clutches 53 and 53a are journaled on these hubs as shown, said clutches having gear toothed peripheries as indicated at 54. A bearing hanger 55 is depended from the housing top 17 to one side of the frontal driven clutch 53 and in similar manner a hanger 55a is depended in alignment and on the opposite side of the rear clutch 53a. Operating gear segments 56 and 56a are pivoted at 57 to the hangers 55 and 55a respectively, one of the said segments meshing with the toothed peripheries 54 of each of the clutches and on opposite sides as shown. Bearing blocks 58 and 58a are formed on the housing bottom 59 below the bearing hangers and are provided with bores 60 extending forwardly and rearwardly in which crankshafts 61 and 61a are journaled as shown. These crankshafts terminate at their forward ends in inwardly turned crank fingers 62 and 62a below the eccentric pin 9 to which they are connected by cranks 63 and 63a journaled on said pin and pivoted at 64 to said fingers and at their rear ends the crankshafts likewise terminate in crank fingers 65 and 65a here turned outwardly instead of inwardly and pivotally connected by connecting rods 66 and 66a to arms 67 extended outwardly from the gear segments 56 and 56a. It will now be evident that as the eccentric carrier 8 and pin 9 are moved off center by tilting the foot pedal 19 as described the cranks 63 and 63a will set up a rocking motion in the crankshafts 61 and 61a and a similar motion in the gear segments 56 and 56a causing an oscillatory movement of the clutches 53 and 53a on their hubs 52 and 52a. The extent or length of this oscillation and rocking stroke of the parts is directly controlled by the distance to which the pin 9 is moved off center as hereinbefore pointed out and this variation in oscillation and stroke is made use of as will be described to vary the speed of the driven shaft 2 relative to the drive shaft 1. Attention is called at this point to the fact that the speed variation is thus stepless or what might be termed "flowing" since the pin 9 may be moved off center to any minute degree by proper motion of the foot pedal 19.

In order to connect the clutches 53 and 53a to the driven shaft 2 and transform the oscillatory movement of the former into straight away rotation of the latter I provide the structure now to be described. The hubs 52 and 52a have recesses 68 cut in their peripheries at equally spaced points and divided medially by ribs 69 which have spring passages 70a cut through from side to side. A pair of clutch locking wedge pins or rollers 70 and 71 are slidably mounted in each recess 68 and are normally urged apart and outward from the ribs 69 by expansion coil springs 72 bearing at their ends against the pins and passing through the passages 70a. The pins 70 in each hub are hereinafter termed the forward locking pins and the pins 71 the reverse locking pins. It is evident that when the wedge pins 70 are urged outward from the ribs 69 they will wedge between the hub and the bores 73 of the clutches 52 and 52a and lock these clutches to their associated hubs while the clutches rotate in one direction and the same is true when the reverse wedge pins 71 are moved outward. A wedge pin operating pulley 74 is slidably keyed at 75 on the shaft 2 between the hubs and is rigidly connected by tie rods 76 to wedge pin operating plates 77 and 77a also slidably keyed as at 78 to the shaft forwardly and rearwardly of the hubs, said rods 76 passing slidably through apertures 79 in the hubs to cause the pulley and plates to operate as a unit. Wedge pin operating fingers 80 are extended rearwardly at equally spaced points from the rear faces of the frontal plate 77 and pulley 74 and are so set and positioned that they may enter the recesses 68 in the hubs 52 and 52a on the sides in which the reverse wedge pins 71 are mounted and urge these pins inward toward the ribs 69 so that they cannot engage or wedge against the pulleys thus leaving the forward wedge pins 70 free to lock the pulleys to the hubs under influence of the springs 72. In order to thus engage and urge the pins 71 inward the free ends of these fingers 80 are preferably pointed or beveled off as shown at 81. In similar manner wedge pin operating fingers 82 are extended forwardly from the frontal faces of the rear plate 77a and the pulley 74 but these fingers are of course offset laterally or circumferentially relative to the fingers 80 so as to enter the recesses 68 on the other sides of the ribs 69 and move the forward wedge pins 70 inward while the reverse pins 71 are in locking engagement. These fingers 82 are likewise pointed or beveled at their free ends 83 for the same purpose. The length of the fingers 80 and 82 and the spacing between the pulley 74 and plates 77 and 77a is such that when one set of fingers as 80 are extended into the recesses 68 in working position the other set is free of the hubs and vice versa as will be clearly evident in Figure 5.

Figure 3:
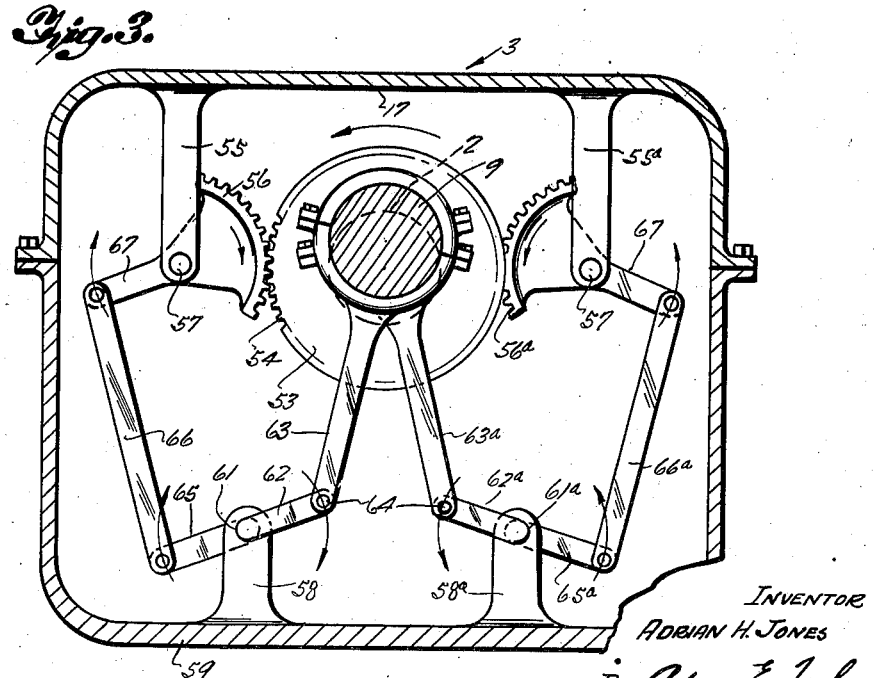
Figure 3 is a section along the line 3—3 in Figure 1 but showing the parts in operating positions.

The operation of the structure as so far set forth will now be described. Assuming that the fingers 80 are engaged with the reverse wedge pins 71 to hold them inward and free the foot pedal 19 is tilted forwardly moving the eccentric carrier 8 and pin 9 outward out of center or line with the shafts 1 and 2 as hereinbefore set forth and the cranks 63 and 63a are thus set in motion rocking the crankshafts 61 and 61a and the gear segments 56 and 56a. The gear segments are both rocked downward and then upward at the same time but being located on opposite sides of their respective drive clutches 53 and 53a these clutches are of course rotated or oscillated in opposite directions at all times. If the direction of the driven shaft 2 while in forward speed or driving the vehicle forwardly is counterclockwise as viewed from the front as indicated by the arrows in Figures 3, 6 and 7 the downstroke of the frontal gear segment 56 is the working stroke and the upstroke of the rear segment 56a the working stroke. During each of these working strokes of the gear segments the drive clutches 53 and 53a are rotated in the desired counterclockwise direction and the wedge pins 70 will lock the clutches to the hubs 52 and 52a causing the driven shaft to be rotated. When the eccentric pin 9 is only slightly off center the length of the working strokes is comparatively small and the driven shaft is rotated relatively slowly but as the pin is moved further off center the stroke and consequently the ratio or speed of the driven shaft relative to the drive shaft increases as will be apparent. When the pin is at its greatest distance from center (when the fingers 43 and 49 are pressed flat as described) the speed of the driven shaft is equal to that of the drive shaft when the various parts are properly proportioned. On the return strokes of the gear segments 56 and 56a the wedge pins 70 in usual manner disengage the clutches from their hubs the action of each set of course being exactly opposite so that a continual flow of power to the driven shaft results.

The wedge pin operating pulley 74 and the connected plates 77 and 77a normally rest in position to hold the reserve locking pins 71 out of engagement as shown in Figures 1 and 5 but these parts may be moved forwardly on the driven shaft 2 to disengage these pins (and of course engage the pins 70) upon which what has been referred to as the return stroke becomes now the working stroke since the clutches 53 and 53a are locked on the opposite stroke and the direction of rotation of the driven shaft is reversed to move the vehicle rearwardly. This operation of the pulley 74 and plates 77 and 77a is brought about and controlled by a reverse shifter fork 85 having pins 86 playing in a peripheral slot 87 in the pulley and terminating in an arm 88 extending upward through an opening 89 in the housing top 17 and fulcrumed at 90 between bearing ears 91 formed on the housing. A control handle 92 is fulcrumed at 93 on the dash C in convenient reach of the driver and is connected by links 94 and bell crank levers 95 to the upper end 96 of the arm 88 in such manner that the shifter fork and the pulley and plate assembly may be moved forwardly or rearwardly by an upward or downward motion of the handle. When the handle 92 is pulled upward to move the parts to reverse position a pedal stop arm 97 fulcrumed to a bracket 98 and connected at 99 to the upper link 94 is swung rearwardly out into the path of the toe portion of the foot pedal 19 so that this pedal can only be depressed a certain amount and the speed of the driven shaft limited to a safe degree in this way. When in the forward speed position of the parts the stop arm 97 lies far enough ahead and clear of the pedal 19 as shown in Figure 1 and in dotted lines in Figure 4 to allow the pedal to be operated to the fullest extent.

The forward end of the driven shaft 2 and the adjacent rear end of the pilot bearing block 12 have aligned diametrically opposite key ways 100 and 101 and locking keys 102 are arranged to slide endwise therein. A pulley 103 is slidably mounted on the driven shaft 2 over the key ways 100 and is secured rigidly to the keys 102 by pins 104 whereby said keys may be moved back and forth in the key ways by corresponding sliding movement of the pulley on the shaft. An arm 105 is pivotally mounted at 106 to a bracket 107 depended from the housing top 17 over the pulley 103 and terminates at its lower end in a fork 108 having pins 109 playing in a peripheral groove 110 in said pulley. A connection link or bar 111 is pivoted at 112 to the arm 105 intermediate its ends and thence extends forwardly to the shifter arm 26 where it has a longitudinally extended and elongated slot 113 in which plays a pin 114 on the shifter arm. A retractile coil spring 115 normally pulls back the arm 105 and holds the pulley 103 in such position that the keys 102 rest only in the keyways 100 and clear the bearing block 12, the pin 114 in normal position resting at the rearmost end of slot 113. Now as the pedal 19 is tipped forward and the driven shaft set in motion as fully described the pin 114 travels freely along the slot 113 not moving the link 111 or arm 105 but as the shifter arm 26 reaches its full speed position designated at C (Figure 2) the pin comes to the end of the slot. A slight further movement of the shifting lever to the point D (Figure 2) now pulls on link 111 and carries the arm 105 forward sliding the pulley 103 along the shaft and extending the keys 102 forward into the keyways 101 bridging the gap between the driven shaft 2 and bearing block 12. The drive and driven shafts 1 and 2 are thus locked rigidly together to rotate as a unit and both at engine speed. When the shifter arm 26 is thus moved to this position D to lock the shafts together the shifter pulley 30 comes to rest over the portion 48 on the forward toggle lever 47 and the spring 45 thus moves the eccentric carrier 8 back to center position and the clutches 53 and 53a and their associated operating mechanism are at rest. Unnecessary wear on these parts is thus prevented while the car is in high speed. When it is desired to stop the pedal 19 is tipped back down in the opposite direction allowing the spring 115 to pull the keys 102 free of the keyways 101 to disengage the shafts and simultaneously the shifter collar 30 operates the toggle levers 36 and 47 to set the clutch mechanisms in operation and then reduce the speed ratio and stop as the pedal is returned to normal position.

I claim:

In a transmission including drive and driven shafts, direct drive means for locking the two together, also a selective variably speed transmission drive for connecting the shafts and same including an eccentric, a control means for the direct and variably drive means including a shifting lever fulcrumed on the drive shaft and connected to the eccentric, a pulley slidably mounted on the drive shaft and adapted to engage and operate the shifting lever to adjust the eccentric, a shifting fork engaging the pulley for shifting the same, pedal operated means for swinging the shifting fork to and fro to shift the pulley, a pulley connected to and operating the said direct drive means, a shifting fork operatively connected to this pulley and spring set to normally hold the direct drive means disengaged, and a connecting link connecting the two shifting forks whereby said direct drive means will be engaged when both the drive and driven shafts reach the same speed through operation of the variable speed drive means.

ADRIAN H. JONES.